Figure 1:
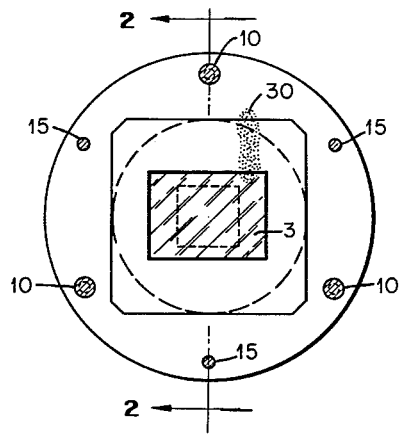

April 14, 1964  T. A. LOVE ETAL  3,129,329
FAST NEUTRON SPECTROMETER USING SPACED SEMICONDUCTORS
FOR MEASURING TOTAL ENERGY OF NEUTRONS CAPTURED
Filed March 10, 1961  2 Sheets-Sheet 1

INVENTOR.
Temple A. Love
BY  Richard B. Murray

ATTORNEY

April 14, 1964    T. A. LOVE ETAL    3,129,329
FAST NEUTRON SPECTROMETER USING SPACED SEMICONDUCTORS
FOR MEASURING TOTAL ENERGY OF NEUTRONS CAPTURED
Filed March 10, 1961    2 Sheets-Sheet 2

INVENTORS.
Temple A. Love
BY Richard B. Murray

ATTORNEY

United States Patent Office 3,129,329
Patented Apr. 14, 1964

3,129,329
FAST NEUTRON SPECTROMETER USING SPACED SEMICONDUCTORS FOR MEASURING TOTAL ENERGY OF NEUTRONS CAPTURED
Temple A. Love and Richard B. Murray, Oak Ridge, Tenn., assignors to the United States of America as represented by the United States Atomic Energy Commission
Filed Mar. 10, 1961, Ser. No. 94,949
10 Claims. (Cl. 250—83.1)

This invention relates to neutron-sensitive silicon surface-barrier counters, and more particularly to a counter that serves as a spectrometer for measuring the differential energy spectrum of fast neutrons.

The development of instrumentation for fast-neutron spectroscopy has received considerable attention in recent years. One of the best and most widely used techniques at present is time-of-flight spectroscopy usually used in conjunction with charged-particle accelerators. There remains, however, a class of problems for which fast-neutron spectrum is desirable, but which either does not warrant the complexity of the time-of-flight instrumentation or for which the time-of-flight technique is not applicable.

Semiconductor neutron detectors have been previously employed to detect neutrons and to determine approximate values of neutron flux. Nucleonics, April 1959, page 116. In one form a silicon detector consisted of a pn junction coated with less than 1 mg./cm.$^2$ of Li$^6$F and was used for detecting slow neutrons. For fast neutrons 1 mm. of paraffin was placed over the detector.

This prior art device is used as a neutron detector. It is not able to measure the differential energy spectrum of incoming fast neutrons and cannot serve as a spectrometer. For example, suppose the source gives off neutrons of different energy, i.e., 1 mev. and 5 mev. The above device permits the detection of these neutrons, but will not indicate the energy thereof. Thus it cannot measure energy distribution of the neutrons of the source. Where ever Li$^6$F is used for slow neutron detection only, the coating is made relatively thick to provide maximum detection efficiency. However, thick coatings are undesirable in a spectrometer for the following reason:

The resultant particles of the Li$^6$+ neutron reaction, namely the $\alpha$+T, lose energy in passing through the Li$^6$F layer, and the amount of energy lost is a function of the path length which they must traverse before entering the sensitive volume of the counter. Since these particles may be given off at any angle with respect to the silicon surface, and since the path length is a function of the angle at which they are given off, this variation in energy loss introduces a broadening in the line width from a monoenergetic neutron source which constitutes a loss in precision in the determination of the differential energy spectrum.

Therefore, in a spectrometer a proper choice must be made between maximum efficiency and minimum spectral line width.

Applicants, with a knowledge of these problems of the prior art, have for an object of their invention the provision of a counter for measuring differential energy spectra of fast neutrons employing plural semiconductor counter elements in sandwich geometry.

Applicants have as another object of their invention the provision of a spectrometer employing semiconductors for measuring energies of fast neutrons.

Applicants have as another object of their invention the provision of a neutron spectrometer for measuring the energy spectrum of neutrons employing a neutron sensitive coating having a thickness which will provide a maximum detection efficiency consistent with minimum line width.

Applicants have as a further object of their invention the provision of a counter for measuring fast-neutron energy spectra employing a pair of detecting elements arranged to have a sandwich geometry which permits the use of an electronic coincidence circuit to discriminate against counts from background radiation.

Applicants have as a still further object of their invention the provision of a spectrometer for measuring the energy spectrum of neutrons where the neutron device is small in size and therefore introduces a minimum perturbation of the neutron flux which is undergoing measurement.

Applicants have as a still further object of their invention the provision of a neutron counter which is relatively insensitive to gamma ray background when compared to other nuclear radiation counters such as scintillation counters.

Other objects and advantages of our invention will appear from the following specification and accompanying drawings, and the novel features thereof will be particularly pointed out in the annexed claims.

Figure 2:
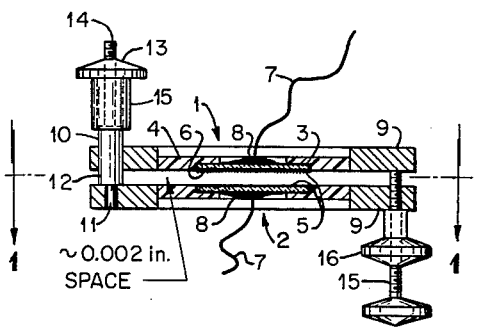
Figure 3:
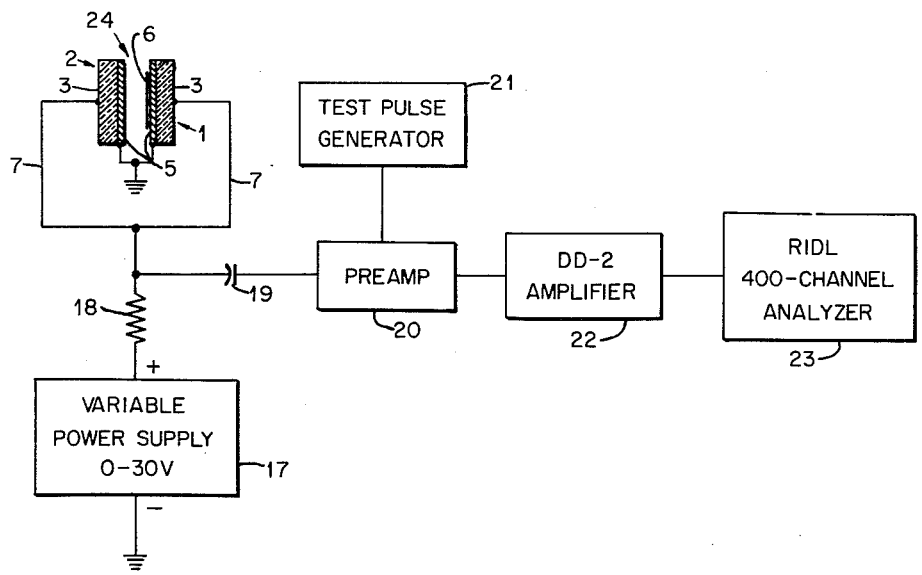
Figure 4:
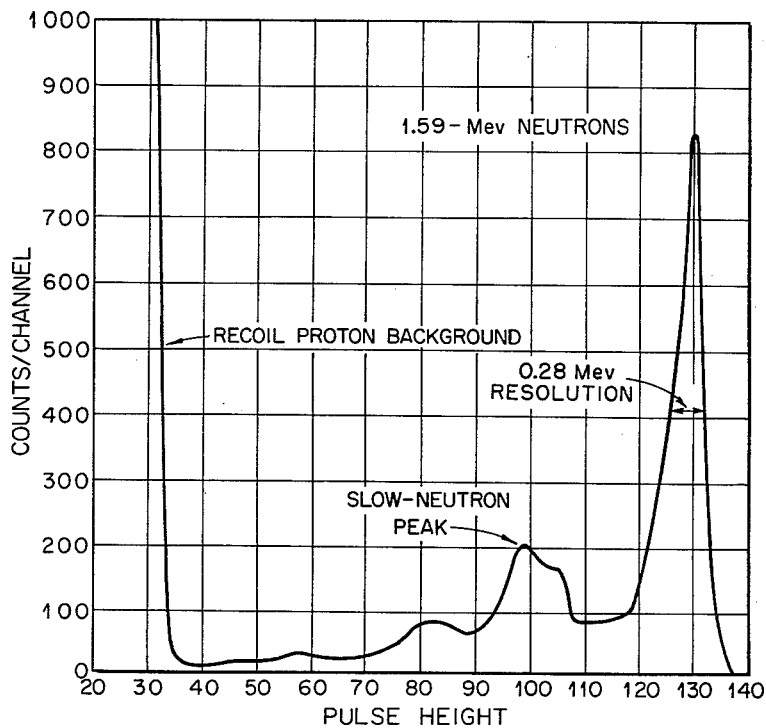
Figure 5:
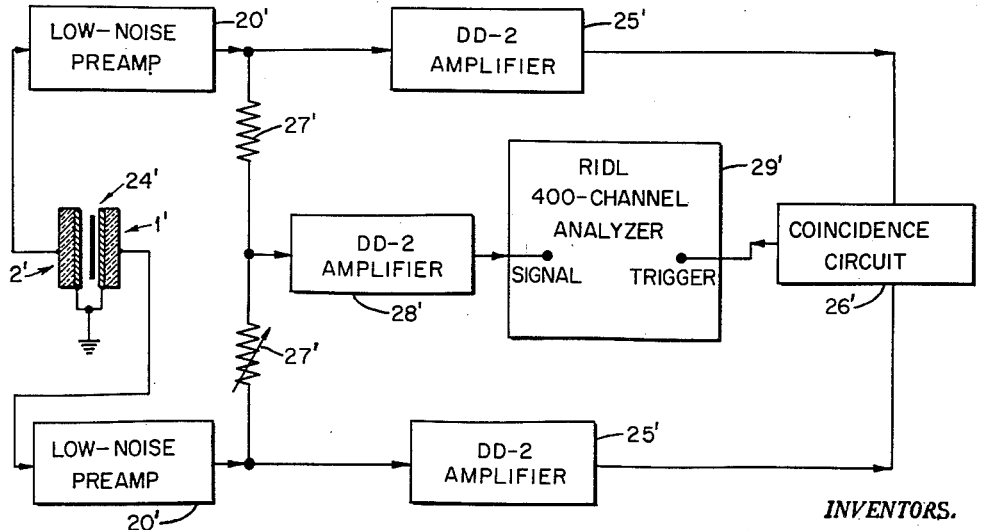

In the drawings, FIG. 1 is a plan view of our improved neutron counter. FIG. 2 is a cross-sectional view in elevation of our improved counter taken along the line 2—2 of FIG. 1. FIG. 3 is a block diagram of the counter circuit employing our improved neutron counter. FIG. 4 is a graph of counts per channel plotted against pulse height of our improved counter. FIG. 5 is a modified block diagram of a counter circuit employing a coincidence circuit fed by our improved counter.

Silicon-gold surface-barrier counters when used as charged-particle spectrometers have shown extremely good energy resolution, approaching a few tenths of a percent for collimated $\alpha$ particles with energy of about 5 mev. The neutron-sensitive counter has been constructed by vacuum-evaporating a thin layer of Li$^6$F between two surface barrier counting elements. Neutrons are detected by observing the energy deposition in the counters of the $\alpha$+T pair resulting from the Li$^6$(n,$\alpha$)T reaction. Pulses from the two counting elements are added and the sum pulse is amplified and recorded on a multi-channel analyzer. Since the simultaneous detection of both reaction products is permitted by the sandwich geometry, the magnitude of the sum pulse should be proportional to the energy of the incoming neutron plus the reaction Q value (4.78 mev.).

The pulse-height spectrum will exhibit a distribution which will be a function of neutron energy, the thickness of the Li$^6$F layer, the thickness of the gold, and the separation distance of the two diodes.

Referring now to FIGS. 1 and 2 wherein our improved sandwich counter is shown, the arrangement includes two silicon-gold counting elements, generally designated 1 and 2. Each counting element comprises a silicon plate 3 recess seated in a thin fluorothene block 4. The opposed faces of the plates 3, 3 of the counting elements carry a thin coating of gold. Formed on or bonded to the gold coating of the upper counting element so as to be interposed or sandwiched between the two counting elements 1, 2 is a thin coating 6 of Li$^6$F of the order of 150 $\mu$g./cm.$^2$, which is vacuum-evaporated on one counter element prior to assembly. Electrical leads 7, 7 are conductively bonded to the plates 3, 3 by suitable means. The fluorothene blocks 4, 4 are set in metal rings which are preferably of aluminum. The rings 9, 9 are aligned by a plurality of circumferentially-spaced guide pins 10 having their reduced ends 11 seated in and secured to one ring 9 and having the enlarged shank portion 12 passing through a bore in the upper ring 9. An elongated clamping nut 13 is threaded on upper reduced end 14 in such a manner that the lower skirt portion engages and urges the upper ring 9 toward the lower ring. Also spaced from each other circumferentially and from the guide pins 10 are a plurality of positioning screws which pass through threaded bores in rings 9 and bear against the opposed face of upper ring 9 so as to space the two rings 9, 9 apart a predetermined distance or interval. The positioning screws are maintained in locked position by lock nuts 16 threaded upon the shanks of positioning screws 15 to engage the lower face of the lower ring 9. This arrangement permits the two counter elements to be brought close together by positioning screw 15 and serves to rigidly clamp them through the action of clamping nut 13. In practice, it is desirable to separate counting elements 1, 2 by the shortest distance practicable to avoid losing counts from the "edge effect." Care should be exercised to prevent scratches on the gold face. Electrical contact to the gold surface of each counter is made with a narrow streak of silver paint or a very small wire 30 leading from the periphery of the gold surfaces 5, 5 to the rings 9, 9. The rings are then electrically grounded.

While a $Li^6F$ coating was used in the preferred embodiment of our invention, it may be noted that $Li^6$ metal or any other material suitable which produces a pair of charged particles upon capture of a neutron where the total energy of the particles is uniquely related to the energy of the neutron captured by the material. $Li^6F$ has the advantage that it is a resonably stable compound chemically. It may also be noted that while silicon was selected as the charged particle counting element, any semiconductor that will satisfactorily serve as the charged-particle counting element may be employed. As an example, germanium is a semiconductor which would serve as a suitable counting element under the proper conditions.

Referring to the block diagram of FIG. 3, counting elements 1, 2 are coupled together through their gold coatings 5, 5 and are grounded. Leads 7, 7 serve to couple the silicon elements 3, 3 together and into a circuit including a power source 17 and coupling resistor 18 of the order of 500,000 ohms. They also serve to couple capacitor 19, preferably of the order of .01 $\mu f.$, to the input of a preamplifier to which is also coupled a test pulse generator 21, and the output of the preamplifier 20 feeds through a DD-2 (double delay) amplifier or its equal of conventional type such as described in the Review of Scientific Instruments, vol. 27, 7, 475 (1956), and into a conventional multichannel analyzer 23 such as the RIDL 400 channel analyzer.

In this arrangement a reverse bias of about 30 to 100 volts from source 17 is applied through 500,000 ohm (but this value is not critical and any other suitable resistor may be used) resistor 18 and the output signal from the counter 24 appearing across resistor 18 is fed through the coupling capacitor 19 to preamplifier 20. It may be noted that capacitor 19 also serves to block D.C. from the source 17 out of the input of preamplifier 20.

It may also be noted that positive potential from source 17 is applied to the silicon plates 3, 3 to maintain them at a positive potential with respect to the gold coating 5, 5. However, any other circuit arrangement which will provide this necessary potential relationship between the silicon and the gold may be used. If the counter 24 is of the large area type, its capacity results in a relatively small signal, and this necessitates a low-noise preamplifier 20 to provide an adequate signal to noise ratio. The DD-2 amplifier 22 into which the signal is fed preferably has a clipping time of 1.2 $\mu sec.$ The amplifier signal is then analyzed in the RIDL 400 channel analyzer 23. The linearity and zero of the equipment can be checked after each run with the mercury-relay test-pulse generator 21.

In the counter 24, with the thin layer 6 of $Li^6F$ positioned between the counting elements 1, 2, neutrons are detected by observing the $\alpha+T$ pairs resulting from the $Li^6(n,\alpha)T$ reaction; pulses from the two counter elements 1, 2 are added. Since the counter geometry permits simultaneous detection of both reaction products, the magnitude of the resulting sum pulse is proportional to the energy of the incident neutron and the reaction Q value (4.78 mev.). The sum pulse from across resistor 18 is amplified in preamplifier 20 and amplifier 22 and is recorded on multichannel analyzer 23. Any suitable low noise cathode follower output preamplifier, such as that shown in FIGURE Q-2069B-C of Appendix II of TID-6119, issued in August 1960 by the United States Atomic Energy Commission, is suitable.

The pulse-height distribution from monoenergetic neutrons on the "sandwich" detector of the type described here will exhibit a much broader peak than single counters used in α particle spectrometers of the prior art since the $\alpha+T$ reaction products are subject to energy loss in the $Li^6F$ and gold layers before reaching the sensitive volume of silicon. The energy loss in a particular event depends on the angle at which the reaction products are emitted; since the $\alpha+T$ may be emitted at any angle, the energy loss is a variable from some minimum value up to the total energy available. In a practical counter, with a $Li^6F$ layer of finite thickness, this variable energy loss will govern the width of a monoenergetic neutron peak, with a much smaller contribution from the inherent line width of the silicon counter.

Pulse-height spectra for neutrons ranging from 0.59 to 14.7 mev. have been studied with this counter and other similarly constructed counters. FIG. 4 is typical of these results. In every case, a well-defined fast-neutron peak is observed. A subsidiary slow-neutron peak is also observed in the spectrum and arises from the presence of a small number of degraded, low-energy neutrons. These low-energy neutrons apparently arise from the immediate vicinity of the counter itself, since the relative intensities of the fast and slow-neutron peaks were essentially unaffected upon surrounding the counter with a cadmium shield. A possible neutron moderator is the wax used on the back of each counter for securing the "pig-tail" lead.

An additional effect to be noted in the fast-neutron spectra is the presence of a very large and steep background below the slow-neutron peak. The energy corresponding to the cutoff of this background is very closely correlated with the incident neutron energy, indicating that this effect is due to recoil protons following (n,p) scattering.

A large fraction of this background has been eliminated by omitting the use of hydrocarbons in construction of subsequent counters. This new technique of construction requires that the gold layer terminate short of the periphery of the silicon surface. This also necessitates a proportional reduction in the area of the $Li^6F$ coating.

The "edge effect," that is the loss out the edges of the counter, can be minimized in two ways: (1) by minimizing the separation distance of the two counters, and (2) by evaporating the $Li^6F$ layer over an area less than that of the silicon counter, leaving a blank strip around the border. Both of these techniques were employed with the counters used in the present study. As previously indicated, the separation distance was of order 0.001 to 0.002 in. Prior to evaporation of the $Li^6F$, each counter was covered with a plastic mask containing a rectangular aperture which defined the area of the gold face to be covered. The dimensions of the aperture were about 0.9 times the dimensions of the silicon counter.

Pulse-height spectra have been recorded from neutrons on several sandwich counters. In a first set of experiments neutrons of known energy were produced by the $T(p,n)He^3$ reaction, using the ORNL 5-Mv Van de Graaff generator to accelerate the incident protons. The target consisted of a layer of ZrT of nominal thickness 1 mg./cm.$^2$ which had been evaporated on a platinum backing. The sandwich counter in all cases was placed at 0 deg. with respect to the proton beam and was located about 1 in. in front of the target. The plane of the $Li^6F$ layer was perpendicular to the direction of the proton beam. Neutron energies were calculated from published tables, taking into account the energy loss of protons passing through the ZrT layer. The full energy spread of neutrons incident on a sandwich counter, arising from both proton energy loss and the angular acceptance of the counter, was small compared to the neutron-peak width in the pulse-height spectra. Slow neutrons (thermal and epithermal) were obtained by moderating fast neutrons, derived from the T(p,n)He$^3$ reaction or from a Po-Be source, by blocks of paraffin.

These experiments indicate possible future applications of neutron detectors of this type for certain problems involving detection or spectroscopy of fast neutrons. The principal advantage of such a detector appears to be its simplicity of construction and operation, its small size, and a reasonably good resolution for neutrons of energy above 1 to 2 mev. A further advantage is the ability of the counter to accept neutrons from any direction, thereby eliminating the need for neutron collimation. Of course, the detection efficiency is limited by the amount of the Li present. A layer $150\mu$ gm./cm.$^2$ of Li$^6$F as used in these counters offers efficiency of order $3 \times 10^{-3}$ for thermal neutrons and $1 \times 10^{-6}$ for 2-mev. neutrons, assuming normal incidence of the incoming neutrons.

In the arrangement of FIG. 5, diodes 1' and 2' of counter 24' feed into separate preamplifiers 20', 20'. The outputs of preamplifiers 20', 20' are coupled to a coincidence circuit 26' through separate DD-2 pulse-height selector channel amplifiers 25' and through coupling resistors 27', 27' and through intermediate DD-2 channel amplifier 28' to multichannel analyzer 29'. The output of coincidence circuit 26' is coupled into a trigger in analyzer 29'.

The functional properties of the coincidence circuit 26' are described in "Electronic Instrumentation for a Multiple-Crystal Gamma-Ray Scintillation Spectrometer," by T. A. Love et al. (ORNL-1929), available from the Office of Technical Service, Washington, D.C. The coincidence circuit informs the analyzer whether or not the requirements imposed have been met and the analyzer records a count if all the hereinafter enumerated requirements have been met.

The circuit requires simultaneous events (within the resolving time=$0.1\mu$ sec.) in the two counters comprising the sandwich, thus recording Li$^6$(n,$\alpha$)T events in which the alpha and triton particles are stopped in separate counters but eliminating those cases in which energy is deposited in only one counter. A further restriction imposed was that the energy deposition in each counter had to be at least 1.6 mev.

The action of channel amplifiers 25', 25' is as follows:
The energy deposition in the corresponding counter of more than 1.6 mev. will cause amplifiers 25' to produce a signal which is constant in time (within $10^{-8}$ sec.) with respect to the reaction event. The coincidence circuit inspects the outputs of both amplifiers 25', 25' to ascertain if a signal appears in both within $10^{-7}$ sec. This time could be made much smaller but it is not considered that this change would make a substantial improvement. If a signal from both amplifiers 25', 25' is seen by the coincidence circuit, the coincidence circuit will allow the multichannel analyzer to record the sum pulse that appears in amplifier 28'. If less than 1.6 mev. is deposited in either counter the coincidence circuit will not see a signal from that particular counter and therefore will not allow the analyzer to record the sum pulse of amplifier 28'.

Having thus described our invention, we claim:

1. In a fast neutron spectrometer the improvement comprising first and second closely adjacent radiation detectors, each of which produces an electrical signal, neutron-sensitive means disposed between said detectors which produces a pair of particles whose total energy is uniquely related to the energy of the neutron captured by said neutron-sensitive means, and means for adding together the signals produced by each coincident pair of particles in said detectors to produce an output proportional in amplitude to the energy of said incident neutron.

2. A spectrometer for fast neutrons comprising a pair of spaced semiconductor detectors, an element interposed between said detectors responsive to neutrons for producing a pair of charged particles for each neutron captured by said element, each of said detectors being adapted to receive one of said charged particles, and means coupled to the detectors for combining signals and measuring them.

3. A spectrometer for fast neutrons comprising a pair of spaced semiconductor detectors, an element interposed between said detectors responsive to neutrons for producing a pair of charged particles for each neutron captured by said element, each of said detectors being adapted to collect one of said charged particles, means coupled to the detectors for combining the signals, therefrom, and an analyzer for measuring the magnitude of signals to determine the neutron energy.

4. A spectrometer for measuring the energies of fast neutrons comprising a pair of closely spaced semiconductor plates, a coating of neutron sensitive material interposed between the plates, said material responding to incident neutrons to produce a pair of charged particles for each captured neutron which migrate to opposite plates, means for joining the plates together, and coupling means for feeding the signals from said plates to an analyzer for sorting the signals according to magnitude neutron energy.

5. A fast neutron counter system comprising a pair of opposed semiconductor plates positioned in spaced relation, a layer of Li$^6$F disposed between the plates for emission of a pair of charged particles upon the capture of each neutron, each of said plates serving to collect one of said particles, amplifying means coupled to the output of the plates for combining the signals therefrom, and an analyzer fed by the amplifier for determining the neutron energy as a function of the magnitude of the signals.

6. A fast neutron spectrometer comprising opposed barrier counting plates set in closely spaced relation, a layer of neutron sensitive material interposed between the plates to emit a pair of charged particles for each neutron captured by said neutron-sensitive material, each of said plates being adapted to collect one of said charged particles, means for coupling the plates to combine the signals therefrom, and a multichannel analyzer for sorting the signals according to magnitude in order to determine the energies of the neutrons.

7. A fast neutron spectrometer comprising a pair of closely-spaced semiconductor plates, a thin layer of Li$^6$F of the order of 150 $\mu$g./cm.$^2$ adapted to emit a pair of charged particles upon the capture of each incident neutron interposed between the plates and positioned on one of the opposed surfaces of the plates, said plates being adapted to collect the charged particles, coupling means for combining the signals from the two plates, and an analyzer fed by the plates for sorting the signals according to magnitude to indicate the energy of the incident neutrons.

8. A fast neutron spectrometer comprising a pair of opposite closely-spaced silicon-gold surface-barrier counters, a layer of neutron-sensitive material interposed between the counters for emitting a pair of charged particles for each neutron captured by said neutron-sensitive material, one charged particle of said pair migrating to each one of said counters, means for coupling the counters to combine the signals therefrom, and a multichannel analyzer fed by the counters for sorting the signals according to neutron energy.

9. A fast neutron spectrometer comprising a pair of opposite closely-spaced semi-conductor counter plates, means for varying the distance between the plates, a layer of Li$^6$F positioned between the plates and responsive to incident neutrons for producing a pair of charged particles for each captured neutron, said plates each being adapted to collect one of the pair of charged particles, means for coupling the plates to combine the signals produced by the particles, and an analyzer for sorting the signals according to magnitude to measure the energy of the incident neutrons.

10. A spectrometer for fast neutrons comprising a pair of opposite closely-spaced silicon-gold surface-barrier detectors, a Li⁶F coating on one of the opposed surfaces of the detectors for emitting a pair of charged particles for each neutron captured by said Li⁶F coating, means coupled to the two counting elements for adding the pulses, and an analyzer fed by the counters for sorting the pulses according to magnitude in order to determine the energy of the incident neutrons.

References Cited in the file of this patent

UNITED STATES PATENTS

| | | |
|---|---|---|
| 2,753,462 | Moyer et al. | July 3, 1956 |
| 2,867,727 | Welker et al. | Jan. 6, 1959 |
| 3,043,955 | Friedland | July 10, 1962 |

OTHER REFERENCES

Graphite Sphere Neutron Detector, by Macklin; Nuclear Instruments I (1957), 335–339; North Holland Publishing Co., Amsterdam.

---

UNITED STATES PATENT OFFICE

CERTIFICATE OF CORRECTION

Patent No. 3,129,329            April 14, 1964

Temple A. Love et al.

It is hereby certified that error appears in the above numbered patent requiring correction and that the said Letters Patent should read as corrected below.

Column 1, line 20, after "which" insert -- a --; column 3, line 27, for "resonably" read -- reasonably --; column 6, line 17, after "signals" strike out the comma; line 29, before "neutron" insert -- to determine --.

Signed and sealed this 13th day of October 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,129,329                 April 14, 1964

Temple A. Love et al.

It is hereby certified that error appears in the above numbered patent requiring correction and that the said Letters Patent should read as corrected below.

Column 1, line 20, after "which" insert -- a --; column 3, line 27, for "resonably" read -- reasonably --; column 6, line 17, after "signals" strike out the comma; line 29, before "neutron" insert -- to determine --.

Signed and sealed this 13th day of October 1964.

(SEAL)
Attest:

ERNEST W. SWIDER
Attesting Officer

EDWARD J. BRENNER
Commissioner of Patents